United States Patent
Tajima et al.

(10) Patent No.: US 7,527,676 B2
(45) Date of Patent: May 5, 2009

(54) UNIT FOR SEPARATING GAS

(75) Inventors: Yoshinori Tajima, Tokyo (JP); Takashi Futatsuki, Koto-ku (JP); Tetsuya Abe, Ibaraki (JP); Sadamitsu Tanzawa, Ibaraki (JP); Seiji Hiroki, Ibaraki (JP)

(73) Assignee: Organo Corporation, Tokyo (JP)

( * ) Notice: Subject to any disclaimer, the term of this patent is extended or adjusted under 35 U.S.C. 154(b) by 317 days.

(21) Appl. No.: 10/566,489

(22) PCT Filed: Jun. 2, 2004

(86) PCT No.: PCT/JP2004/007616

§ 371 (c)(1),
(2), (4) Date: Aug. 15, 2006

(87) PCT Pub. No.: WO2005/009595

PCT Pub. Date: Feb. 3, 2005

(65) Prior Publication Data

US 2007/0084345 A1   Apr. 19, 2007

(30) Foreign Application Priority Data

Jul. 29, 2003   (JP) .............................. 2003-282062

(51) Int. Cl.
*B01D 53/02* (2006.01)
(52) U.S. Cl. .............................. 96/104; 96/106; 95/86; 95/88; 73/23.39
(58) Field of Classification Search ............... 95/82, 95/86, 88, 90, 128, 141, 142, 143; 96/101, 96/104, 106, 108, 131, 132; 73/23.39
See application file for complete search history.

(56) References Cited

U.S. PATENT DOCUMENTS

| | | | | |
|---|---|---|---|---|
| 3,285,701 A | * | 11/1966 | Robertson | .................... 436/106 |
| 3,724,170 A | * | 4/1973 | Allen et al. | .................... 95/86 |
| 4,534,207 A | * | 8/1985 | Szakasits et al. | ........... 73/23.38 |
| 4,772,296 A | * | 9/1988 | Potts | ............................. 95/87 |
| 5,069,887 A | * | 12/1991 | Suenaga et al. | ................ 95/128 |

(Continued)

FOREIGN PATENT DOCUMENTS

JP   47-48107   12/1972

(Continued)

OTHER PUBLICATIONS

Excerpt from a Taiwanese Office Action for Counterpart Application No. 093120644 dated Aug. 2, 2005 (English language—1 page; Taiwanese language 2 pages) (3 pages Total).

(Continued)

*Primary Examiner*—Duane Smith
*Assistant Examiner*—Robert A Clemente
(74) *Attorney, Agent, or Firm*—Osha • Liang LLP (57) ABSTRACT

A unit for separating an exhaust gas containing PFC gases including $CF_4$ and $C_2F_6$ generated in a production process, wherein the exhaust gas is concentrated in a concentration device, and then separated chromatographically in a chromatographic separation device using nitrogen as a carrier gas. The chromatographic separation device is packed with molecular sieve 13X or F-9 or the like. The unit is capable of effectively separating $CF_4$ and $C_2F_6$.

9 Claims, 8 Drawing Sheets

U.S. PATENT DOCUMENTS

| | | | |
|---|---|---|---|
| 5,612,225 A * | 3/1997 | Baccanti et al. | 436/114 |
| 6,074,459 A * | 6/2000 | Gingrich et al. | 95/118 |
| 6,425,946 B1 * | 7/2002 | Funke et al. | 96/108 |
| 6,530,980 B2 * | 3/2003 | Abe et al. | 96/4 |
| 6,547,861 B2 * | 4/2003 | Funke et al. | 96/108 |
| 6,551,387 B2 * | 4/2003 | Abe et al. | 96/104 |
| 6,702,874 B2 * | 3/2004 | Tajima et al. | 95/86 |
| 6,702,989 B2 * | 3/2004 | Sacks et al. | 422/89 |
| 6,706,534 B2 * | 3/2004 | Sacks et al. | 436/161 |
| 6,783,576 B2 * | 8/2004 | Funke et al. | 96/108 |
| 6,783,577 B2 * | 8/2004 | Funke et al. | 96/108 |
| 6,797,036 B2 * | 9/2004 | Funke et al. | 95/90 |
| 2002/0023540 A1 | 2/2002 | Abe et al. | |
| 2002/0059863 A1 | 5/2002 | Tajima et al. | |
| 2002/0141925 A1 | 10/2002 | Wong et al. | |

FOREIGN PATENT DOCUMENTS

| | | |
|---|---|---|
| JP | 2002-35527 | 2/2002 |
| JP | 2002-147948 | 5/2002 |
| JP | 2002-273144 | 9/2002 |

OTHER PUBLICATIONS

International Search Report for PCT/JP2004/007616 dated Aug. 3, 2004 (1 page).

esp@cenet Abstract for JP2002273144 dated Sep. 24, 2002 (1 page).

esp@cenet Abstract for JP2002035527 dated Feb. 5, 2002 (1 page).

English-language Abstract for Japanese Publication No. 47-48107 published Dec. 4, 1972 (3 pages).

esp@cenet Abstract for JP2002147948 dated May 22, 2002 (1 page).

* cited by examiner

UNIT FOR SEPARATING GAS

TECHNICAL FIELD

The present invention relates to a unit for separating gas, which separates each of a plurality of specific gases from a treatment gas containing the specific gases.

BACKGROUND ART

Conventionally, a variety of different gases are used in semiconductor production processes, depending on the nature of the individual process. For example, PFC (perfluoro compound) gas, which includes a variety of fluorine-containing compounds such as $CF_4$, $NF_3$, $C_3F_8$, $SF_6$ and $CHF_3$, is used as a reactive gas in dry etching processes and thin film formation processes, and an exhaust gas containing this PFC gases is produced.

Exhaust gases such as PFC gas cannot be simply discharged from the system, and must be treated using a variety of treatment methods. Examples of these treatment methods include (i) decomposition treatments in which the PFC gas is decomposed by combustion, catalytic heating, or plasma decomposition or the like, (ii) membrane separation in which the materials are separated by a membrane, (iii) cryogenic separation in which separation is achieved by utilizing differences in the boiling points of the gases, and (iv) adsorption treatments.

However, there are drawbacks associated with decomposition treatments (i) in that achieving complete decomposition is difficult, and the fact that because the gas is decomposed and discharged, it cannot be recovered and reused. Furthermore, although membrane separation (ii) enables the removal of nitrogen from an exhaust gas, the separation of gases of similar molecular size such as $CF_4$ and $NF_3$ is problematic. Moreover, the aforementioned method (iii) requires an extremely large apparatus, and is very expensive in terms of both running costs and the cost of the facilities. Furthermore, the difference in boiling point between $NF_3$ and $CF_4$ is only 1° C., meaning separation of these two gases is very difficult. The method (iv) requires regular replacement of the adsorbent, which leads to costs associated with the disposal of the used adsorbent.

Accordingly, Japanese Patent Laid-Open Publication No. 2002-273144 proposes a device for separating PFC gases that uses a chromatographic separation device packed with an activated carbon filler. The device disclosed in Japanese Patent Laid-Open Publication No. 2002-27314 is able to effectively separate $CF_4$ and $NF_3$.

However, it was found that the device disclosed in Japanese Patent Laid-Open Publication No. 2002-27314 was unable to satisfactorily separate a mixed gas of $CF_4$ and $C_2F_6$, for example. As described above, PFC gas contains a variety of different gases, and a unit that is capable of effectively treating and separating this type of multi-component PFC gas has been keenly sought.

DISCLOSURE OF INVENTION

The present invention provides a unit for separating gas that is capable of effectively separating each of the components from a PFC gas containing a plurality of components.

The present invention provides a unit for separating gas, which separates each of a plurality of specific gases from a treatment gas containing the specific gases, wherein the unit contains a plurality of columns packed with different fillers, and by connecting these columns in series, and passing the treatment gas sequentially through the fillers of the plurality of columns, each of the specific gases is separated chromatographically from the treatment gas.

Furthermore, the present invention also provides a unit for separating gas, which separates each of a plurality of specific gases from a treatment gas containing the specific gases, wherein the unit contains a column packed with a plurality of different fillers, and by passing the treatment gas through the plurality of fillers inside the column, each of the specific gases is separated chromatographically from the treatment gas.

By conducting chromatographic separation using a plurality of fillers in this manner, the plurality of specific gases can be separated effectively.

Furthermore, the aforementioned specific gases are preferably PFC gases discharged from semiconductor production processes, and the aforementioned treatment gas is preferably a gas that also contains nitrogen gas.

Furthermore, the specific gases preferably include $NF_3$, $CF_4$, and $C_2F_6$, and the aforementioned fillers preferably include zeolite and activated carbon.

Furthermore, the zeolite is preferably the molecular sieve 13X or an equivalent product.

As described above, the present invention enables a plurality of specific gases to be separated effectively, by conducting chromatographic separation using a plurality of fillers.

BEST MODE FOR CARRYING OUT THE INVENTION

As follows is a description of a preferred embodiment of the present invention, based on the drawings.

Figure 1:
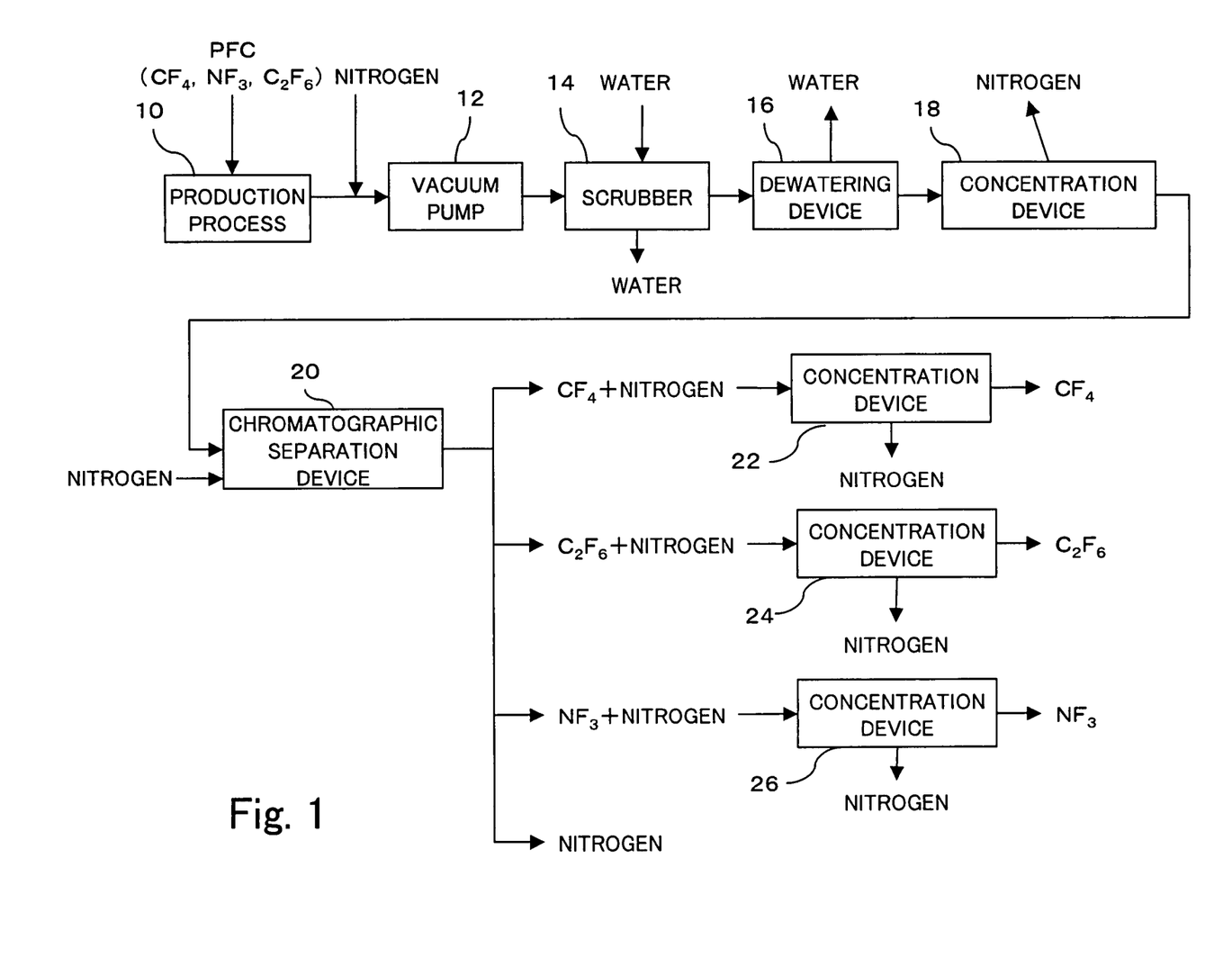
FIG. 1 is a diagram showing the structure of an embodiment of the present invention.

A PFC gas is supplied to a production process 10 such as an etching or thin film formation process conducted at a semiconductor production plant. As a result, an exhaust gas containing the PFC gas is produced. An inlet for a suction pump 12 is connected to the path of the exhaust gas, and the exhaust gas containing the PFC gas is extracted from the production process 10 by this suction pump 12. Gases such as $CF_4$, $NF_3$, $C_2F_6$, and $SF_6$ can be used as the PFC gas, and in this embodiment, the PFC gas contains $CF_4$, $C_2F_6$, and $NF_3$. Because the PFC gas decomposes and generates hydrofluoric acid during the production process 10, the exhaust gas also contains hydrofluoric acid. As a result, if the exhaust gas is introduced directly into the suction pump 12, then there is a danger that the suction pump 12 may be damaged. Furthermore, the exhaust gas also contains metals generated during etching and the like, meaning if the exhaust gas is introduced directly into the suction pump 12, there is a danger that deposits may accumulate inside the suction pump 12. Accordingly, nitrogen ($N_2$) gas is supplied as a diluent gas at a point prior to the exhaust gas reaching the suction pump 12, thereby diluting the exhaust gas.

The outlet of the suction pump 12 is connected to a scrubber 14, and the nitrogen-diluted exhaust gas is supplied to the scrubber 14. This scrubber 14 uses a water shower to dissolve and remove hydrofluoric acid (HF) and any other water-soluble acidic materials contained within the exhaust gas.

The exhaust gas from the scrubber 14 is then supplied to a dewatering device 16, where moisture is removed from the gas. The exhaust gas from the scrubber contains a large quantity of moisture, and it is preferable to remove this moisture prior to the subsequent steps. Although any form of dewatering device can be employed as the dewatering device 16, devices that remove the moisture by lowering the temperature of the exhaust gas are preferred.

The exhaust gas containing the PFC gas and nitrogen is then supplied to a concentration device 18. This concentration device 18 is used for removing the nitrogen, and is preferably a membrane separation device that employs a gas permeable membrane. This device separates the nitrogen from the exhaust gas, thereby concentrating the PFC gas (the $CF_4$, $NF_3$, and $C_2F_6$ in this embodiment).

Having been concentrated in this manner, the PFC gas is supplied to a chromatographic separation device 20. The chromatographic separation device 20 includes a column packed with a desired filler, and the gas is passed through this column. Because each of the gas components exhibits a different affinity (adsorption and desorption coefficient) for the filler, the retention times for each component vary, thus enabling the gas to be separated into its components. In other words, the $CF_4$, $NF_3$, and $C_2F_6$ are separated. Because nitrogen gas is used as a carrier gas in the chromatographic separation, each gas is generated as a mixed gas with nitrogen.

At this point, the mixed gas of $CF_4$+nitrogen is supplied to a concentration device 22, $C_2F_6$+nitrogen is supplied to a concentration device 24, and $NF_3$+nitrogen is supplied to a concentration device 26. These concentration devices 22, 24 and 26 are similar to the concentration device 18 described above, and can employ membrane separation devices. Within these membrane separation devices, by employing a structure wherein the concentrated gas is either circulated a number of times, or treated in a plurality of stages, almost 100% of the nitrogen can be separated, meaning pure $CF_4$ gas, $NF_3$ gas, and $C_2F_6$ gas can be obtained at concentrations of 100%.

The $CF_4$ gas, $C_2F_6$ gas, and $NF_3$ gas can be recovered and reused within the production process 10.

As described below, the chromatographic separation device 20 usually also yields a fraction that contains both $CF_4$ and $NF_3$, but the $CF_4$ and $NF_3$ can be separated by subjecting this mixed fraction to further separation, and consequently this $CF_4$+$NF_3$ fraction has been omitted from the diagram.

In this manner, by using the chromatographic separation device 20, the present embodiment enables $CF_4$, $C_2F_6$, and $NF_3$ gases to be separated effectively. Moreover, the separated $CF_4$, $C_2F_6$, and $NF_3$ gases can be recovered and reused.

Figure 2:
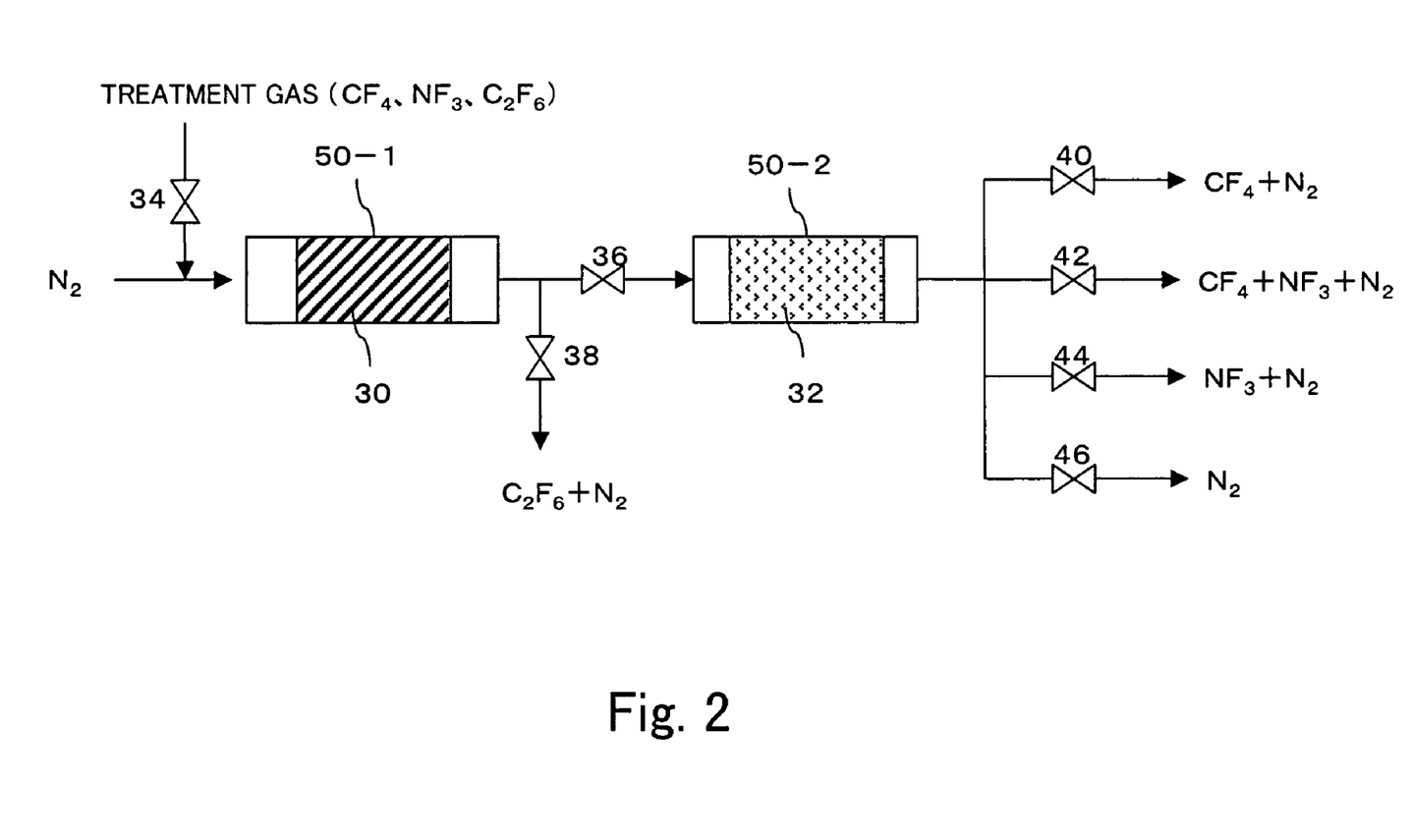
FIG. 2 is a diagram showing the structure of a chromatographic separation device that uses a plurality of columns.

FIG. 2 shows an example of the structure of the chromatographic separation device 20. In this example, the chromatographic separation device 20 includes two columns, namely a first column 50-1 and a second column 50-2, connected together in series. The first column 50-1 is packed with a zeolite (molecular sieve 13X) 30 with a predetermined pore size, and the second column 50-2 is packed with palm shell activated carbon 32. The first column 50-1 is supplied continuously with nitrogen gas ($N_2$), and is also supplied intermittently with the treatment gas containing $CF_4$, $NF_3$ and $C_2F_6$ via a valve 34. The outlet of the first column 50-1 is connected to the inlet of the second column 50-2 via a valve 36, and is also able to discharge $C_2F_6$ gas via a valve 38. In addition, the outlet of the second column 50-2 is able to discharge $CF_4$+$N_2$ gas via a valve 40, $CF_4$+$NF_3$+$N_2$ gas via a valve 42, $NF_3$+$N_2$ gas via a valve 44, and nitrogen ($N_2$) gas via a valve 46.

In this type of chromatographic separation device 20, first the valves 34, 38, 40, 42 and 44 are closed, the valves 36 and 46 are opened, and the first and second columns 50-1 and 50-2 are flushed with $N_2$ carrier gas. From this state, the valve 34 is opened, and a predetermined quantity of the treatment gas is supplied in a pulse-like manner. This treatment gas should preferably be supplied to the first column 50-1 with minimal dilution by the $N_2$ gas. Appropriate switching of the valves may also be used to temporarily halt the supply of $N_2$ while the treatment gas is supplied.

Figure 3:
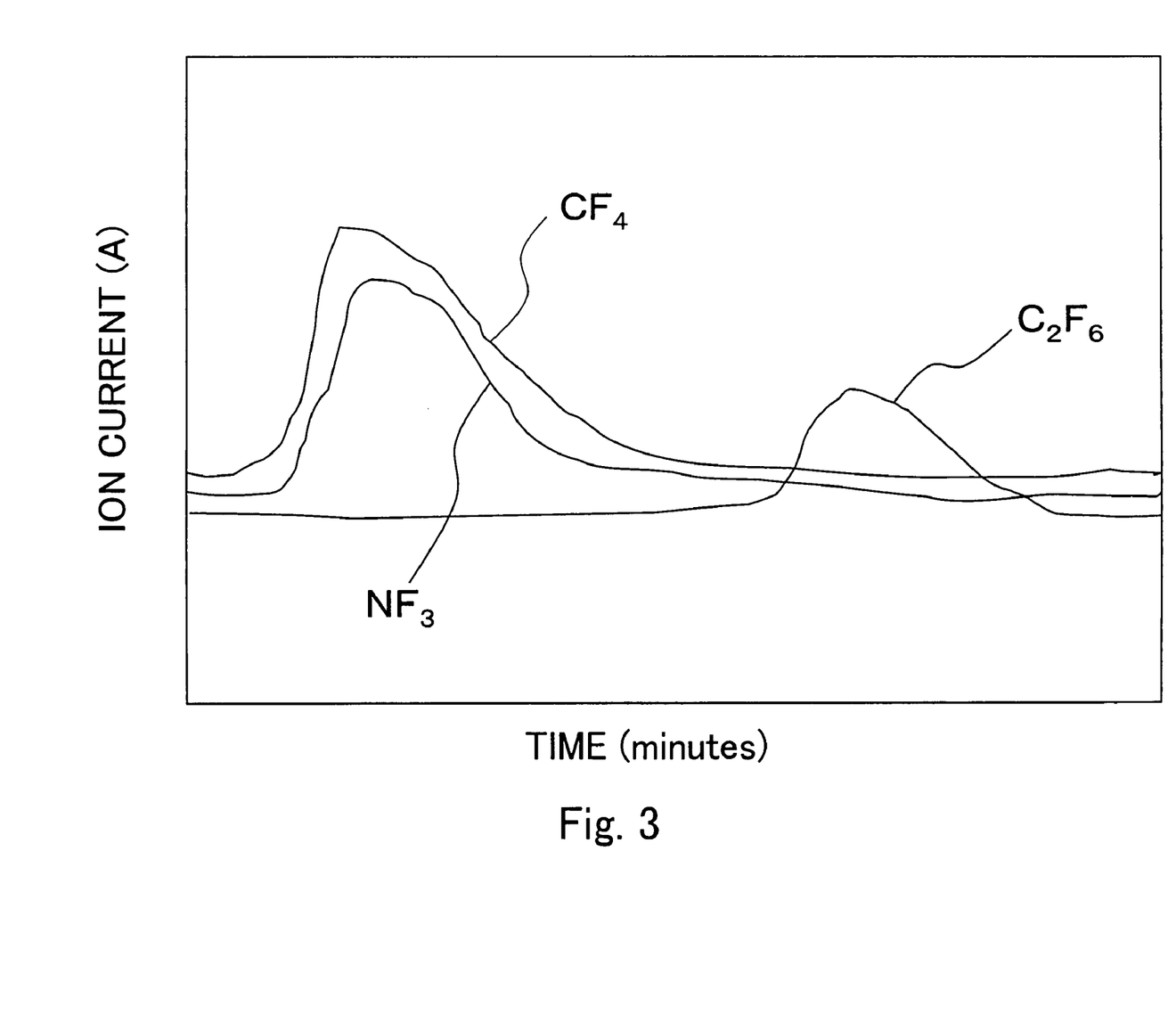
FIG. 3 is a graph showing the state of gas flow at the outlet of the first column.

Following the supply of the predetermined quantity of the treatment gas, the valve 34 is closed, and the supply of the $N_2$ gas can be recommenced. The $CF_4$, $NF_3$ and $C_2F_6$ within the treatment gas is separated by the molecular sieve 13X inside the first column 50-1. In other words, the $C_2F_6$ is slower to desorb from the molecular sieve 13X than the $CF_4$ and $NF_3$. Consequently, as shown in FIG. 3, the $CF_4$+$NF_3$ fraction from the treatment gas appears first at the outlet of the first column 50-1, with the $C_2F_6$ fraction appearing considerably later.

Accordingly, when the $C_2F_6$ is discharged, the valve 36 is closed and the valve 38 is opened, thus enabling separation and extraction of the $C_2F_6$ gas. Once extraction of the $C_2F_6$ has finished, the valve 38 is closed and the valve 36 is opened.

Figure 4:
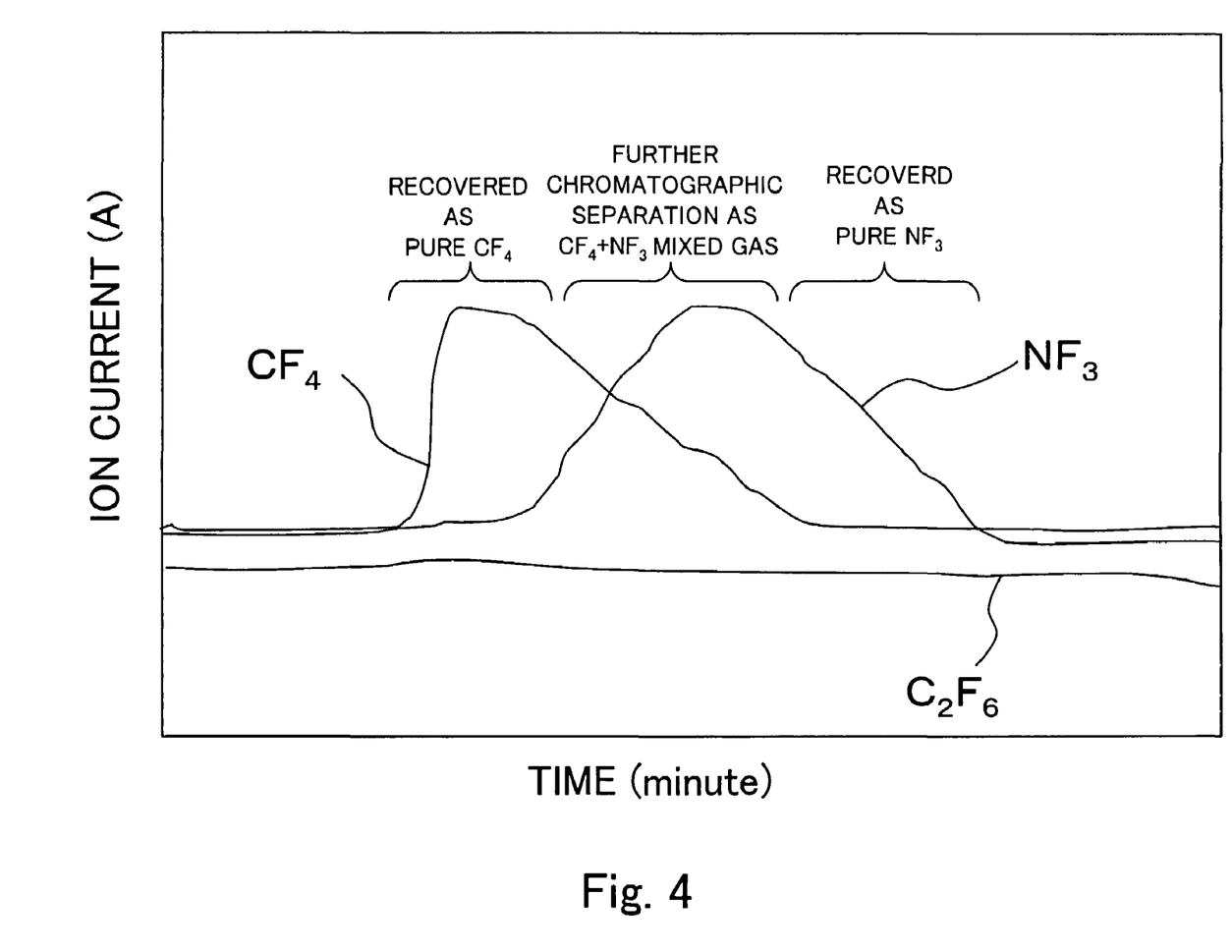
FIG. 4 is a graph showing the state of gas flow at the outlet of the second column.

As a result, the second column 50-2 is supplied with a treatment gas that contains $CF_4$ and $NF_3$, but contains no $C_2F_6$. In the second column 50-2, the $CF_4$ and $NF_3$ are separated by the activated carbon 32. In other words, the $NF_3$ is slower to desorb from the activated carbon than the $CF_4$. Consequently, as shown in FIG. 4, the $CF_4$ fraction from the treatment gas appears first at the outlet of the second column 50-2, with the $NF_3$ fraction appearing later. The $CF_4$ and $NF_3$ are not completely separated at this point, and a mixed gas containing both components is discharged in the middle. Accordingly, when the $CF_4$ is discharged, the valve 46 is closed, the valve 40 is opened, and $CF_4$+$N_2$ is collected, when $CF_4$+$NF_3$ is discharged, the valve 40 is closed, the valve 42 is opened, and $CF_4$+$NF_3$+$N_2$ is collected, and when $NF_3$ is discharged, the valve 42 is closed, the valve 44 is opened, and $NF_3$+$N_2$ is collected. The $CF_4$+$NF_3$ fraction may be further separated using a separate column packed with activated carbon. Alternatively, the $CF_4$+$NF_3$+$N_2$ may also be returned to the treatment gas side of the separation device.

In this manner, $C_2F_6$+$N_2$, $CF_4$+$N_2$, and $NF_3$+$N_2$ fractions can be collected separately.

Figure 5:
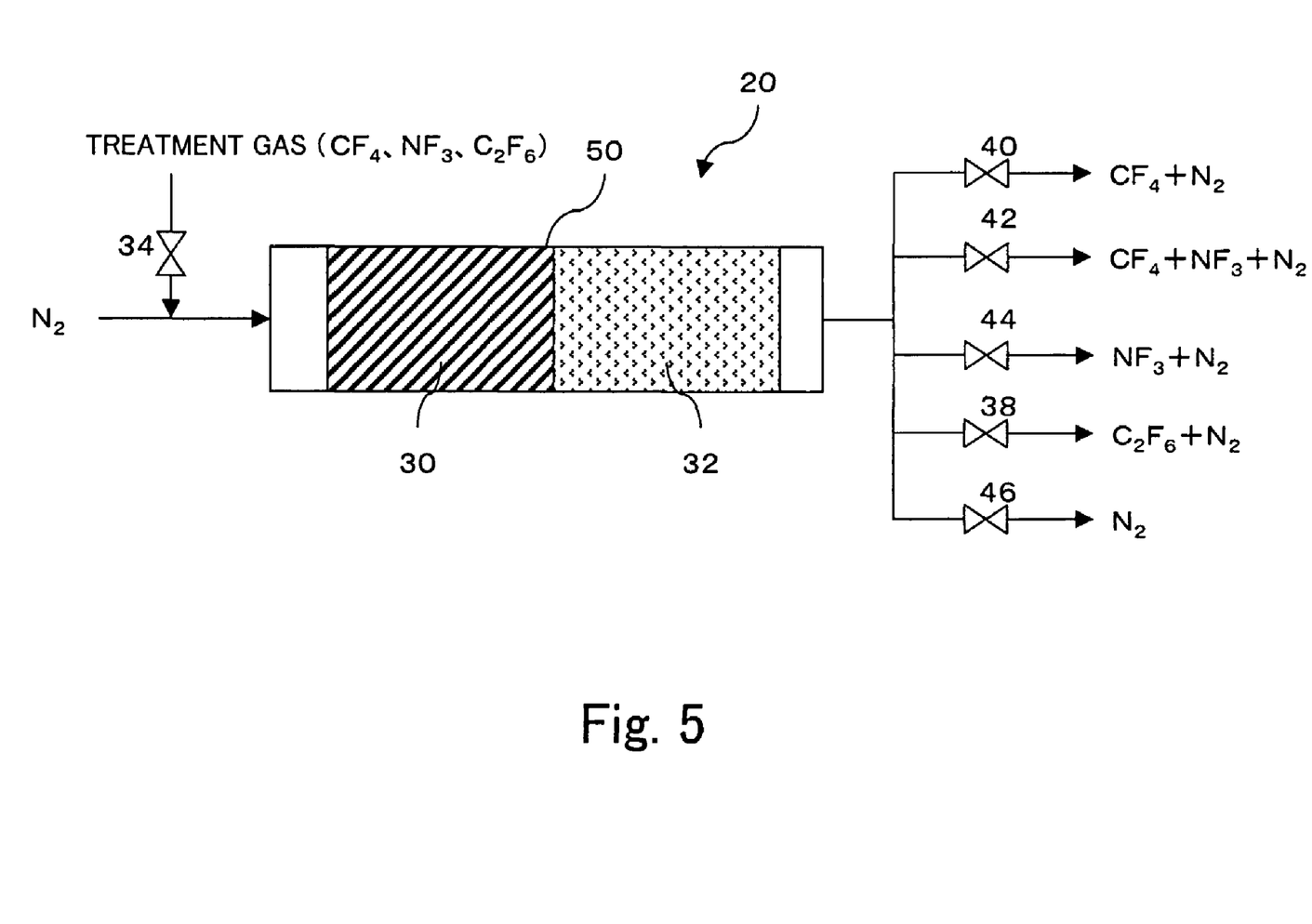
FIG. 5 is a diagram showing the structure of a chromatographic separation device that uses a single column containing a plurality of fillers.

FIG. 5 shows an alternative structure for the chromatographic separation device 20. In this example, a single column 50 is packed sequentially with zeolite (molecular sieve 13X) 30 and activated carbon 32, with the zeolite closer to the column inlet. Accordingly, the treatment gas first makes contact with the zeolite 30, and subsequently contacts the activated carbon 32.

Figure 6:
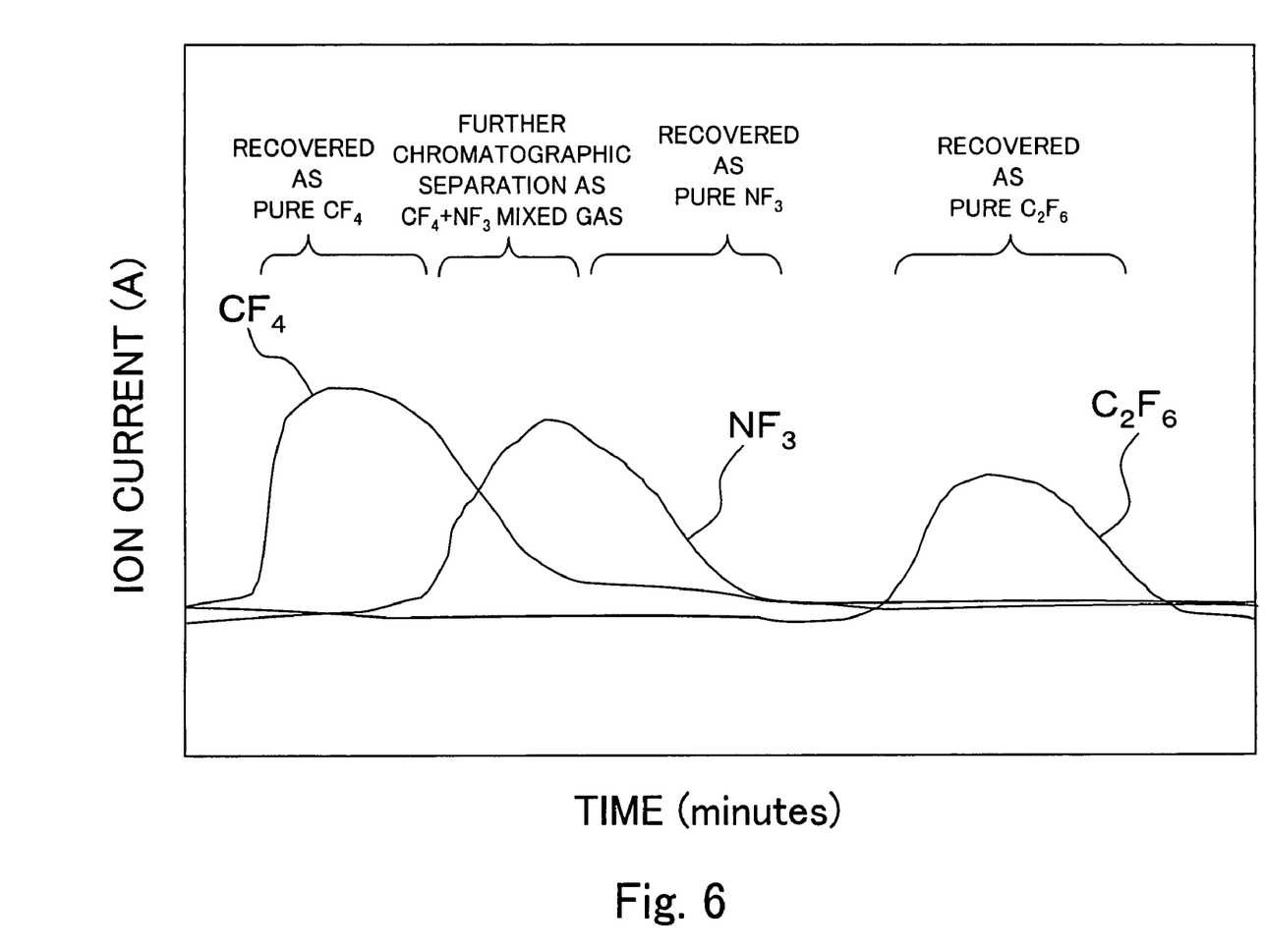
FIG. 6 is a graph showing the state of gas flow at the outlet of the column shown in FIG. 5.

With this type of column 50, gas separation can be conducted in an almost identical manner to that described above for the series-connected first and second columns 50-1 and 50-2. This example differs from that above in that $C_2F_6$ also passes through the activated carbon 32, but even after passage through the activated carbon 32, $C_2F_6$ is still discharged after $CF_4$ and $NF_3$, meaning there is no deleterious impact on the separation performance. In other words, as shown in FIG. 6, the fractions $CF_4$+$N_2$, $CF_4$+$NF_3$+$N_2$, $NF_3$+$N_2$, and $C_2F_6$+$N_2$ appear sequentially at the outlet of the column 50. Accordingly, by opening the valves 38, 40, 42 and 44 in sequence, each of the fractions can be separated and recovered. The $CF_4+NF_3+N_2$ fraction may be further separated using a separate column packed with activated carbon, or may be returned to the treatment gas side of the separation device. Other facets of the structure and the operation of this example are the same as those described in relation to FIG. 2.

In this manner, by using a chromatographic separation device 20 in which the treatment gas is passed sequentially through the two fillers shown in FIG. 2 and FIG. 5, $CF_4$, $NF_3$ and $C_2F_6$ can be separated.

In the examples shown in FIG. 2 and FIG. 5, the chromatographic separation was conducted with the zeolite 30 positioned in the former stage and the activated carbon 32 in the latter stage, but this sequence may also be reversed. Furthermore, in the example of FIG. 5, the zeolite and the activated carbon may also be mixed. However, tests suggest that separating off $C_2F_6$ first using the zeolite 30, and then using the activated carbon 32 to separate $CF_4$ and $NF_3$ leads to a reliable separation, whereas if the sequence is reversed, complete separation of $NF_3$ and $C_2F_6$ may not be possible.

As follows is a description of the separation of $CF_4$ and $C_2F_6$ by the zeolite 30. In this example, a zeolite 30 with a pore size of at least 0.5 nm is used as the filler. By using a zeolite with this type of large pore size, $CF_4$ and $C_2F_6$ can be effectively separated.

In other words, a variety of different zeolites were tested as fillers, and it was found that whereas a molecular sieve 5A (manufactured by GL Sciences Inc.) with a pore size of approximately 5 nm is unable to produce a satisfactory separation, molecular sieve 13X (manufactured by GL Sciences Inc.), and zeolite F-9 (manufactured by Tosoh Corporation), which has a pore size of approximately 0.8 nm (meaning it is unable to adsorb molecules with effective diameters greater than 0.8 nm) and is marketed as an equivalent product to molecular sieve 13X, are ideal for achieving separation.

Currently, there are no zeolites commercially available with a larger pore size than molecular sieve 13X, but it is believed that a zeolite with a larger pore size than molecular sieve 13X would also be usable, although this has not been confirmed.

For $CF_4$ and $C_2F_6$, the maximum molecular diameter, calculated on the basis of the F-F internuclear distance and the F electron cloud radius of 0.133 nm, is 0.4445 nm for $CF_4$ and 5.69 nm for $C_2F_6$. For example, the maximum molecular diameter for $CF_4$ is determined using the equation 0.1785 (the F-F internuclear distance)+0.133×2 (two F).

When molecular sieve 5A is used, it is thought that the reason that separation of $CF_4$ and $C_2F_6$ cannot be achieved reflects the fact that the pore size is smaller than the molecular diameter of the $C_2F_6$. Accordingly, the pore size of the zeolite must be larger than the maximum molecular diameter of $C_2F_6$.

When this type of zeolite is used, the adsorption of $CF_4$ weakens, whereas the $C_2F_6$ continues to be adsorbed. It is thought that this effect is responsible for the reliable separation of the $CF_4$ and $C_2F_6$.

A molecular sieve is normally used for separating molecules that are larger than the sieve pore size from molecules that are smaller, and the conducting of a separation process using a molecular sieve with a pore size that is larger than both of the separation target materials is unusual.

In this embodiment, separation of the target materials $CF_4$ and $C_2F_6$ is achieved using a zeolite with an adsorption pore size that is larger than the maximum diameter of both $CF_4$ and $C_2F_6$.

In this chromatographic separation device 20, nitrogen is used as a carrier gas, and by using this carrier gas to sequentially desorb and discharge the $CF_4$ and $C_2F_6$ adsorbed to the filler, the $CF_4$ and $C_2F_6$ are separated.

In another preferred configuration, a plurality of the above chromatographic separation devices 20 are prepared, and the exhaust gas is passed sequentially through each of these chromatographic separation devices 20, with each fraction collected sequentially from each of the chromatographic separation devices 20.

The collection of each of the component gases at the outlet of the chromatographic separation device 20, and the switching of the valves, are preferably conducted in accordance with the results of analyses performed on the gas at the outlet. For example, the different components can be detected using a quadrupole mass spectrometer (QMS), a differential thermal detector (TCD), or a Fourier transform infrared analyzer (FT-IR), with control then conducted in accordance with the results of the analysis.

EXAMPLES

Figure 7:
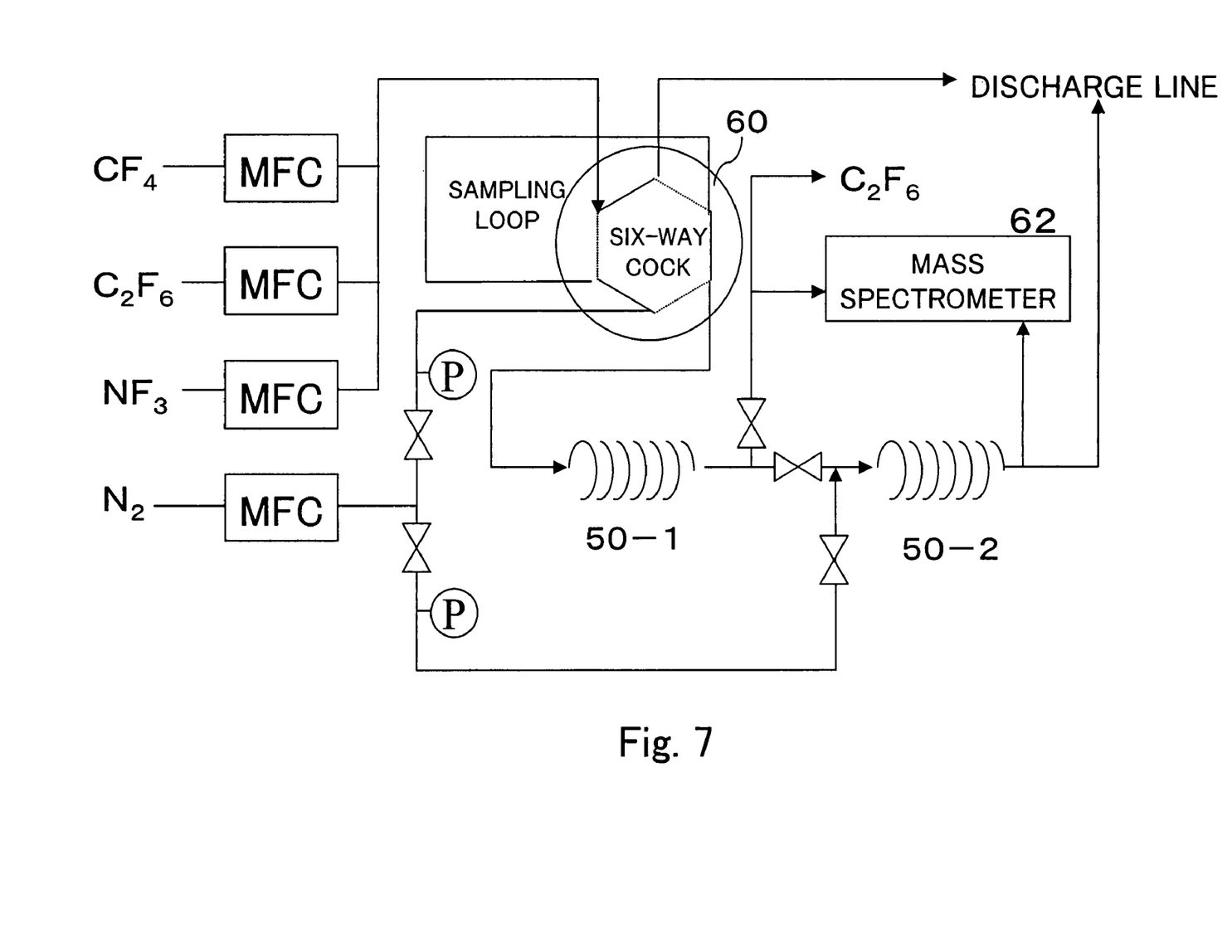
FIG. 7 is a diagram showing the structure of a test unit.

A test was conducted using a test unit with the structure shown in FIG. 7. The unit in FIG. 7 corresponds with the configuration shown in FIG. 2.

The first column 50-1 for the test employed a column in which a 5 m long SUS pipe of outer diameter ⅛ inch was packed with a zeolite 30 comprising molecular sieve 13X (manufactured by GL Sciences Inc.) with a particle size of 60 to 80 mesh. The second column 50-2 for the test employed a column in which a 5 m long SUS pipe of outer diameter ⅛ inch was packed with an activated carbon 32 comprising palm shell activated carbon with a specific surface area of 1158 $m^2/g$ and a particle size of 60 to 80 mesh. The first and second columns 50-1 and 50-2 were connected together in series.

Nitrogen ($N_2$) gas was passed through the first and second columns 50-1 and 50-2 at a flow rate of 35 mL/minute, and a six-way cock 60 was used to introduce a mixed gas of $CF_4$/$C_2F_6$/$NF_3$ ($CF_4$:$C_2F_6$:$NF_3$=1:1:1) in a pulse-like manner. Furthermore, the outlets of both the first column 50-1 and the second column 50-2 were analyzed using a mass spectrometer 62. In the drawing, MFC represents a flow rate controller.

The analysis results from the outlet of the first column 50-1 are shown in FIG. 3, and the analysis results from the outlet of the second column 50-2 are shown in FIG. 4.

The test was conducted at 40° C., but other temperatures are also acceptable. However, because the separation properties vary depending on the temperature, the test is preferably conducted at a constant temperature.

The test results confirmed that by using a pulsed introduction of gas, the respective peaks for the $CF_4+NF_3$ mixture and $C_2F_6$ had completely separated by reaching the outlet of the first column 50-1, meaning that by simply selecting the sampling period, a $CF_4+NF_3$ mixed gas and pure $C_2F_6$ could be obtained. Accordingly, the $C_2F_6$ was extracted, and the $CF_4+NF_3$ mixed gas was fed into the second column 50-2. As a result, it was found that at the outlet of the second column 50-2, the $CF_4$ and $NF_3$ had separated by the time of discharge.

At the outlet of the second column 50-2, pure $CF_4$, an unseparated $CF_4+NF_3$ gas fraction, and pure $NF_3$ were obtained, and the unseparated gas fraction is preferably either returned to the inlet of the series-connected first and second columns, or passed through a separate activated carbon column provided in series, to effect separation and recovery.

Hence, the unit described above was confirmed as being capable of favorable recovery of $CF_4$, $C_2F_6$, and $NF_3$.

Example 2

Figure 8:
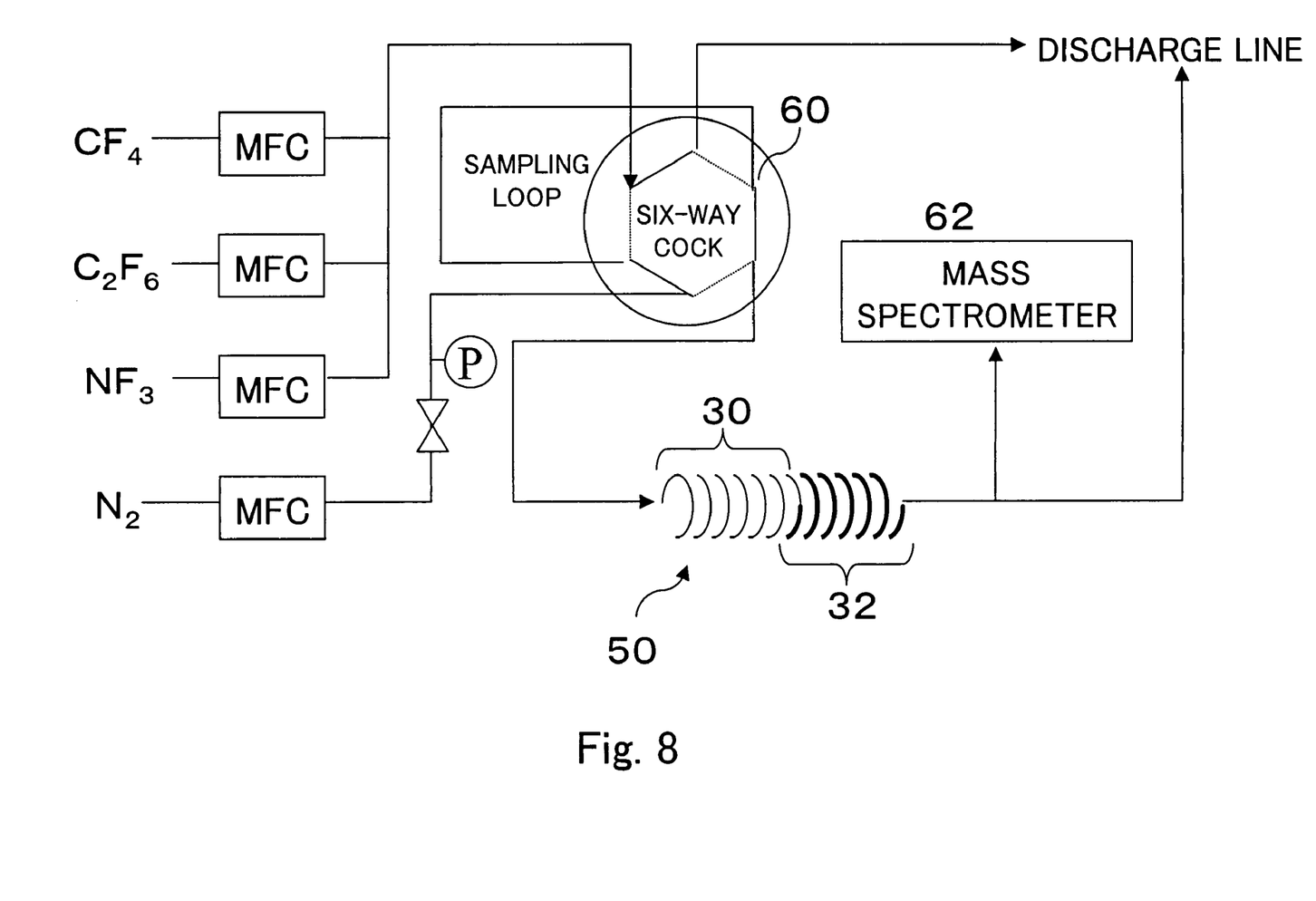
FIG. 8 is a diagram showing the structure of another test unit.

A test was conducted using a test unit with the structure shown in FIG. 8. The column 50 for the test employed a column in which a 10 m long SUS pipe of outer diameter ⅛ inch was packed first with palm shell activated carbon with a specific surface area of 1158 $m^2/g$ and a particle size of 60 to 80 mesh, and then with molecular sieve 13X (manufactured by GL Sciences Inc.) with a particle size of 60 to 80 mesh. This yielded a column such as that shown in FIG. 5, in which the zeolite (molecular sieve 13X) 30 and the activated carbon (palm shell activated carbon) 32 were arranged in sequence along the flow direction of the treatment gas. The packing ratio of the two fillers was 1:1.

Nitrogen gas was passed through the column 50 at a flow rate of 35 mL/minute, and a six-way cock 60 was used to introduce a mixed gas of $CF_4/C_2F_6/NF_3$ ($CF_4:C_2F_6:NF_3$=1:1:1) in a pulse-like manner. The outlet of the column 50 was analyzed using a mass spectrometer 62. In the drawing, MFC represents a flow rate controller.

The analysis results from the outlet are shown in FIG. 6. The test was conducted at 40° C., but other temperatures are also acceptable. However, because the separation properties vary depending on the temperature, the test is preferably conducted at a constant temperature.

The test results revealed that the peaks for $CF_4$, $NF_3$, and $C_2F_6$ appeared sequentially at the outlet of the column 50, confirming that each of the gases could be separated. The unseparated $CF_4+NF_3$ fraction can be separated by passage through a subsequent, separate activated carbon column.

The width of the peaks and the level of overlap of the unseparated portion vary depending on the concentration of the supplied gas, but a satisfactory separation can be achieved by altering the packing ratio (in this example 1:1) of the fillers packed inside the single column.

In this manner, the unit described above was confirmed as being capable of favorable recovery of $CF_4$, $C_2F_6$, and $NF_3$.

Tests were also conducted using F-9 (manufactured by Tosoh Corporation), which is described as having a similar structure to molecular sieve 13X (an equivalent product), as the zeolite 30. This F-9 enabled separation of $CF_4$ and $C_2F_6$ in a similar manner to that observed for the molecular sieve 13X, although the retention times were marginally longer.

The invention claimed is:

1. A unit for separating gases, which separates each of a plurality of specific gases from a treatment gas containing said specific gases, said unit comprising:
    a plurality of columns packed with different fillers, wherein by connecting said columns in series and passing said treatment gas sequentially through said fillers of said plurality of columns, each of said specific gases is separated chromatographically from said treatment gas; and
    a plurality of gas discharge lines connected to an outlet of the plurality of columns, each of the plurality of gas discharge lines having a valve,
    wherein each of said specific gases that is separated chromatographically from said treatment gas is discharged via a corresponding one of the plurality of gas discharge lines.

2. The unit for separating gases according to claim 1, wherein
    said specific gases are PFC gases discharged from a semiconductor production process, and said treatment gas also contains nitrogen gas.

3. The unit for separating gases according to claim 2, wherein
    said specific gases comprise $NF_3$, $CF_4$, and $C_2F_6$, and
    said fillers comprise zeolite and activated carbon.

4. The unit for separating gases according to claim 3, wherein
    said zeolite is molecular sieve 13X.

5. The unit for separating gas according to claim 1, wherein said specific gases comprise $CF_4$ and $C_2F_6$,
    wherein said fillers comprise zeolite, and
    wherein a pore size of the zeolite is larger than a maximum molecular diameter of $C_2F_6$.

6. A unit for separating gases, which separates each of a plurality of specific gases from a treatment gas containing said specific gases, said unit comprising:
    a column packed with a plurality of different fillers, wherein by passing said treatment gas through said plurality of fillers inside said column, each of said specific gases is separated chromatographically from said treatment gas; and
    a plurality of gas discharge lines connected to an outlet of the column, each of the plurality of gas discharge lines having a valve,
    wherein each of said specific gases that is separated chromatographically from said treatment gas is discharged via a corresponding one of the plurality of gas discharge lines.

7. The unit for separating gases according to claim 6, wherein
    said specific gases are PFC gases discharged from a semiconductor production process, and said treatment gas also contains nitrogen gas.

8. The unit for separating gases according to claim 7, wherein
    said specific gases comprise $NF_3$, $CF_4$, and $C_2F_6$, and
    said fillers comprise zeolite and activated carbon.

9. The unit for separating gases according to claim 8, wherein
    said zeolite is molecular sieve 13X.

* * * * *